United States Patent [19]

Oberle

[11] 4,096,030
[45] Jun. 20, 1978

[54] CONTROL SYSTEM FOR A BOILING-WATER NUCLEAR POWER PLANT

[75] Inventor: Arthur Oberle, Ennetbaden, Switzerland

[73] Assignee: BBC Brown Boveri & Company Limited, Baden, Switzerland

[21] Appl. No.: 681,272

[22] Filed: Apr. 28, 1976

[30] Foreign Application Priority Data

Aug. 22, 1975 Switzerland ............... 10895/75

[51] Int. Cl.$^2$ ............... G21C 7/32; G21C 19/04
[52] U.S. Cl. ............... 176/20 R; 176/56
[58] Field of Search ............... 176/20, 22, 24, 26, 176/54–56, 60; 60/644, 660, 664, 665; 415/17

[56] References Cited

U.S. PATENT DOCUMENTS

| | | | |
|---|---|---|---|
| 3,128,233 | 4/1964 | Kuerzel | 176/24 |
| 3,247,069 | 4/1966 | Powell et al. | 176/20 R |
| 3,253,994 | 5/1966 | Kagi | 176/20 R |
| 3,255,084 | 6/1966 | Doroszlai | 176/20 R |
| 3,341,422 | 9/1967 | Gilbert | 176/20 R |
| 3,356,577 | 12/1967 | Fishman | 176/20 R |
| 3,561,406 | 2/1971 | Rupprecht | 176/56 |

Primary Examiner—Samuel W. Engle
Assistant Examiner—S. A. Cangialosi
Attorney, Agent, or Firm—Burns, Doane, Swecker & Mathis

[57] ABSTRACT

A control system for a nuclear power plant which comprises a boiling-water reactor and a steam line including a control valve therein connecting the steam outlet from the reactor to a steam turbine includes a first controller of the "I-action" type responsive to the reactor pressure and a second controller of either the "P-action" or "PD-action" type responsive to the pressure in the steam line immediately in advance of the control valve. A summing device is provided for adding the output signals from the two controllers, and the output from the summing device is applied to the control valve for regulating its operation. For a system wherein a pair of steam lines each including a control valve therein are connected in parallel from the reactor steam outlet to the turbine, transducers are provided for measuring the respective pressures in the steam lines and a second summing device is connected to the outputs from the transducers for determining the mean value of the respective pressures in the steam lines. The output of the second summing device is then connected to the input of the second controller.

2 Claims, 1 Drawing Figure

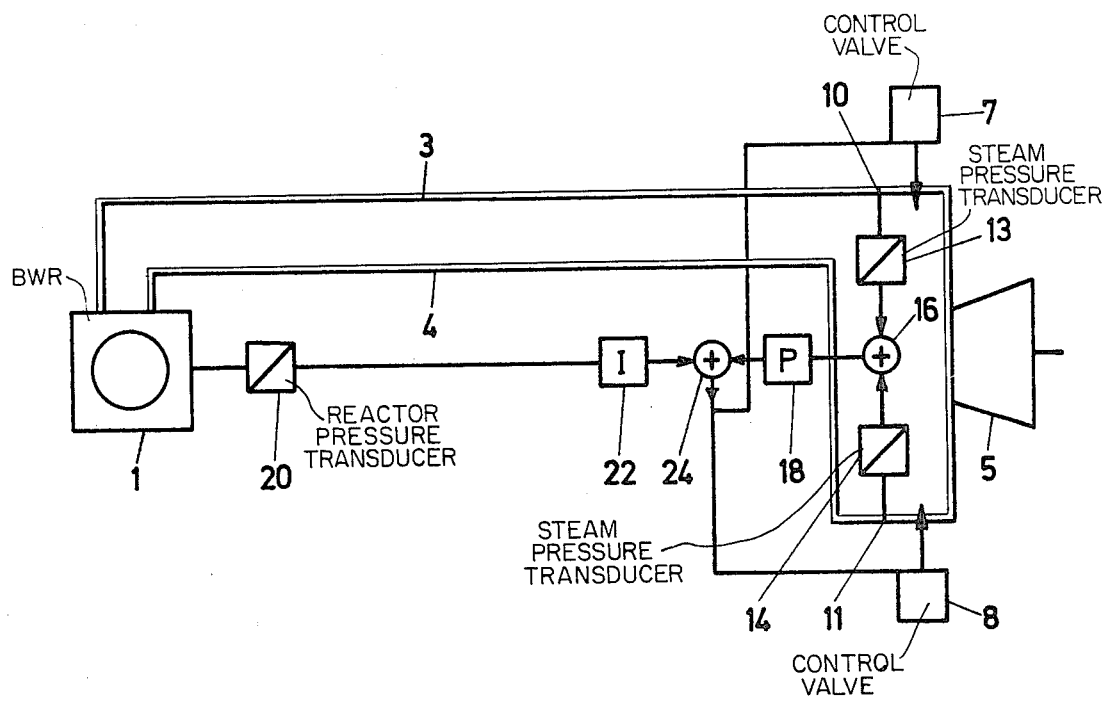

CONTROL SYSTEM FOR A BOILING-WATER NUCLEAR POWER PLANT

This invention concerns an improvement in a control system for a boiling-water nuclear power plant having a reactor and one or more steam turbines, each of which is provided with at least one steam line having a control valve and also means of control to maintain constant pressure in the boiling-water reactor.

Boiling-water reactors are at present operated in such a manner that the steam pressure in the reactor is held constant by a pressure regulator which acts on the turbine governor valves and bypass valves. Pressure variations in the reactor give rise to changes in reactivity owing to changes in volume of steam bubbles present in the water acting as the moderator. With most of the reactor types known today, a rapid rise in pressure causes an increase in neutron flux, and hence an increase in heat release rate. This in turn has the effect of increasing steam production.

To maintain dynamic control of these phenomena, and, if the equilibrium is disturbed by external influences, to prevent large transient changes in neutron flux from leading to reactor shutdown, it is advisable to employ controllers which act as fast as possible, preferably PID controllers. Choice of the measuring site then presents a problem.

The most effective method allowing rapid controller response is to measure pressure close to the turbine valves. Measurement in the pressure vessel, actually the place where the pressure in fact needs to be held constant, introduces a dead time into the control loop. This time is determined by the length of the steam lines, and in the case of large power stations can amount to several tenths of a second. The consequence of this dead time is that the control system becomes less responsive, and it is more difficult to avoid shutdown of the reactor in the event of disturbances.

But measuring pressure at the governor valves also has its drawbacks. In large nuclear power plants there are usually several separate steam lines leading from the reactor pressure vessel to the turbine. A pressure loss proportional to the steam flow rate occurs in these pipes. With constant pressure in front of the valves, the reactor pressure is thus higher by the amount of this pressure loss dependent on flow rate.

For the same reason, additional problems arise when carrying out functional tests on the valves. It is true that these problems can be resolved if, in the case of more than one valve, parallel measuring sites are chosen and the controller is fed with the average value of these different pressure measurements. But the fact remains that both testing the valves and output variations result in undesirable pressure variations in the reactor.

The improved control system in accordance with the invention avoids these shortcomings and is distinctive in that the reactor pressure acts upon an "I-action" controller and the pressure immediately before the control valve acts upon a "P-action" or "PD-action" controller, and the output signals of these controllers are added together with a summing device, the output of which is actively linked to the control valve.

If steam is supplied to a turbine via two steam lines the values obtained from the two pressure measurements in the steam lines ahead of the valves are fed, preferably first by way of appropriate transducers, to a summing device, e.g., one which generates a mean value, the output value of which is passed to the "P-action" or "PD-action" controller.

A preferred embodiment of the invention will now be explained in detail with reference to the accompanying drawing the single FIGURE of which is a schematic diagram of a boiling-water power station plant.

With reference to the drawing steam is passed from a reactor 1 by way of two separate feed lines 3, 4 to a steam turbine 5. The steam flow rate in the two lines 3, 4 is regulated by means of a control valves 7 and 8, respectively. Pressure is drawn off at points 10 and 11 immediately before the control valves 7 and 8. Each pressure acts upon a pressure transducer 13 and 14, respectively, the outputs of which lead to a summing device 16 which generates the mean value of the pressures measured by transducers 13 and 14. This means value is passed to a controller 18, preferably a "P-action" or "PD-action" controller.

At the same time, pressure within the pressure vessel of the reactor 1 is measured by means of a pressure transducer 20. The output of this is connected to a controller 22, preferably an "I-action" controller.

The output of this controller 22 and the output of the controller 18 are fed to a summing device 24. The resulting value, a measure of the controlled variable, is then employed to regulate the control valves 7 and 8, the final control elements. These are adjusted to maintain the desired pressure in the reactor 1.

An arrangement of this kind, whereby the best possible response of the pressure control system is obtained with measuring sites at the final control elements, has the advantage that the pressure in the reactor pressure vessel is held constant.

Controllers of the so-called "P", "I", "PD" and "PID" action type are well known to the art and hence a detailed description of their construction and mode of operation is not believed to be essential to a complete disclosure of the present invention. However, a brief general description of these various types follows:

P — Proportional action controller: output proportional to input deviation $\epsilon$.

I — Integral action: output proportional to $\int \epsilon dt$, the integrated value of deviation $\epsilon$ over time. (Controller with reset action)

D — Differential action: output proportional to $(d\epsilon/dt)$ i.e. the rate of the deviation as a function of time.

$\epsilon$ — Deviation of the controlled variable from a setting value.

PD — Output $= K_1\epsilon + K_2(d\epsilon/dt)$

PID — Output $= K_1\epsilon + K_3\int \epsilon dt + K_2(d\epsilon/dt)$

Wherein: $K_1$, $K_2$ and $K_3$ are adjustable settings on the controller, $K_1$ being the proportional band, $K_2$ the rate, and $K_3$ the reset-time.

I claim:

1. In a control system for a nuclear power plant of the type comprising a boiling-water reactor and a steam turbine connected to the outlet from said reactor by way of a steam line including a control valve therein adjacent the turbine inlet, the improvement which comprises a first pressure sensing means responsive to the pressure at the reactor pressure-vessel, a first controller of the integral-action type controlled by the output of said first pressure sensing means, second pressure sensing means responsive to the pressure in said steam line immediately in advance of said control valve, a second controller of the proportional-action type or combined proportional-differential-action type controlled by the output of said second pressure sensing means, and a summing device for adding the outputs from said first and second controllers, the output from said summing device being applied to said control valve for continuous regulation thereof.

2. A control system as defined in claim 1 wherein a pair of steam lines, each including a control valve and second pressure sensing means responsive to the pressure in the steam line immediately in advance of the control valve, are connected in parallel from the outlet of said reactor to said steam turbine, and wherein a second summing device is provided for ascertaining the mean value of the respective pressures in said steam lines, the inputs to said second summing device being the respective outputs of the second pressure sensing means and the output from said second summing device being the input to said second controller.

* * * * *